United States Patent Office 2,883,398
Patented Apr. 21, 1959

2,883,398

EPOXY-VINYL MONOMERS AND METHOD OF PREPARING THE SAME

Frederick C. Frostick, Jr., and Benjamin Phillips, Charleston, W. Va., assignors to Union Carbide Corporation, a corporation of New York No Drawing. Application December 31, 1957
Serial No. 706,304

2 Claims. (Cl. 260—348)

This invention relates to a novel series of synthetic organic chemical compounds and to a method of preparing the same. More particularly, this invention is directed to a novel series of epoxy-vinyl-type monomers suitable for use in preparing polymers and copolymers.

The compounds of the invention can be conveniently represented by reference to the following general formula:

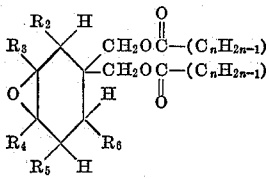

wherein $R_2$ through $R_6$ represent hydrogen or alkyl groups and the group $C_nH_{2n-1}$ represents an aliphatic hydrocarbon radical, free from acetylenic unsaturation, composed of carbon and hydrogen containing $n$ carbon atoms, $2n-1$ hydrogen atoms, wherein $n$ represents a whole positive integer in the range of from 2 through 8. More particularly, the group $C_nH_{2n-1}$ is intended to include unsaturated aliphatic hydrocarbon radicals, free from acetylenic unsaturation, containing from 2 through 8 carbon atoms, such as, for example, vinyl, allyl, crotyl, hexenyl, heptenyl, and the like.

A preferred novel subclass of the compounds of the invention are those characterized by the structural formula set forth above, wherein $R_2$ through $R_6$ represent hydrogen or lower alkyl groups, with the further provision that when any of the substituents $R_2$ through $R_6$ represent lower alkyl groups, the total number of carbon atoms in said lower alkyl groups does not exceed 12.

A particularly preferred novel subclass of the compounds of the invention are those compounds represented by the structural formula set forth above, wherein the substituents $R_2$ and $R_6$ represent methyl groups and $R_1$, $R_3$, $R_4$ and $R_5$ are hydrogen.

The compounds of the invention have been found to be particularly adapted for use as monomers in the preparation of polymers and copolymers since, as may be readily observed, they are bifunctional types of compounds, possessing in one portion of the molecule a vinyl-type group and in another portion of the molecule an epoxy group. The compounds of the invention are capable of polymerization by different mechanisms. For example, 3,4 - epoxycyclohexane - 1,1 - dimethanol di(crotonate) contains two dissimilar polymerizable groups, namely, an alpha-epoxy group

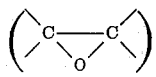

and an olefinic group, ($>C=C<$). As may be observed, the ester can be subjected to polymerization conditions whereby polymerization occurs through the olefinic group to the substantial exclusion of polymerization through the epoxide group. This type of polymerization is often referred to in the art as vinyl polymerization. Polymerization conditions can then be changed to the conditions favoring coupling or cross linking through the epoxide group to produce a hard, infusible, insoluble resin having many desirable properties. This dissimilarity of the polymer-forming groups enables control over polymer formation so as to produce polymers having a diversity of useful properties not generally heretofore available.

The compounds of the invention are prepared by the reaction of peracetic acid and a 3-cyclohexane-1,1-dimethanol di(alkenoate). The reaction whereby the compounds of this invention are prepared can be illustrated by the following general formula in the case of a 3-cyclohexene-1,1-dimethanol di(crotonate):

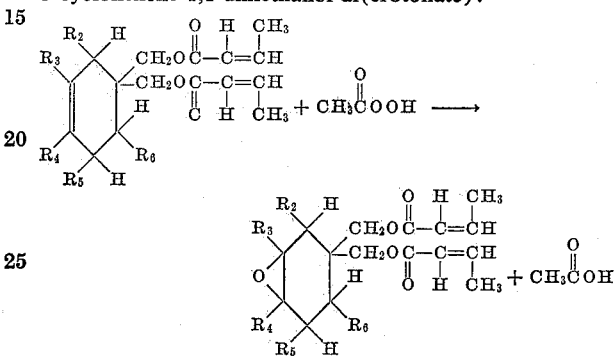

wherein the radicals $R_2$ through $R_6$ are as above defined.

The process of producing the compounds of the invention is carried out at temperatures in the range of from $-25°$ C. to $150°$ C. At lower temperatures, the rate of epoxidation is slow. At high temperatures, the rate of epoxidation is faster, but precautions are necessary to prevent further reaction of the epoxy group. Temperatures in the range of from $10°$ C. to $90°$ C. are preferably used to provide a suitable reaction rate and to avoid undesired side reactions. The olefin starting material is conveniently charged to a reaction vessel and the theoretical quantity of peracetic acid is added. One or more mols of peracetic acid per mol of olefin is usually added to the olefin starting material. The reaction is allowed to proceed until approximately the theoretical amount of peracetic acid is consumed, which is readily determind by periodic tests for contained peracetic acid. The time of reaction is usually from about one to about ten hours, depending on the temperature employed. In working up the crude reaction product, it is preferred, although not absolutely necessary, to separate the acetic acid co-product from the epoxide as rapidly as possible, since it will react with the epoxide to form undesired glycols and glycol acetates, thus decreasing the overall yield of epoxide product. The reaction mixture can then be subjected to conventional recovery procedures for the recovery of the epoxide product. For example, the epoxide product can be recovered by extraction with a suitable solvent; continuous distillation; distillation under reduced pressure or a residue product may be taken.

The starting materials for the production of the epoxides of this invention are the corresponding olefinic materials which can be conveniently characterized by reference to the following general formula:

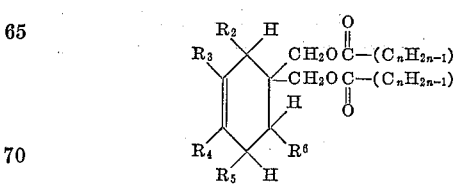

wherein the radicals $R_2$ through $R_6$ and $(C_nH_{2n-1})$ are as defined above. These olefinic materials are conveniently prepared by the esterification of a selected 3-cyclohexene-1,1-dimethanol with two equivalents of an unsaturated aliphatic monobasic fatty acid. The 3-cyclohexene-1,1-dimethanols are obtained by the reaction of the corresponding 3-cyclohexene-carboxaldehydes (prepared by the Diels-Alder reaction of butadiene or a substituted butadiene with acrolein, crotonaldehyde and the like) with excess formaldehyde in the presence of a base catalyst such as KOH as described by H. E. French and D. M. Gallagher in J.A.C.S., 64, 1497 (1942). A variety of cycloaliphatic aldehydes suitable for reaction with formaldehyde to form the corresponding 3-cyclohexene-1,1-dimethanols can be produced having alkyl substituents contained in the ring when compounds such as acrolein and crotonaldehyde are reacted with dienes such as butadiene, piperylene, isoprene, 2,3-dimethyl-1,3-pentadiene and the like.

According to the procedure outlined above, epoxyvinyl monomers can be readily prepared and include epoxyvinyl monomers such as 3,4-epoxycyclohexane-1,1-dimethanol diacrylate; 3,4-epoxycyclohexane-1,1-dimethanol dimethacrylate, and the like.

The analysis for the oxirane oxygen content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

In order to determine the acetic acid content of the reaction mixtures, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and/or acetaldehyde monoperacetate is present in the sample to be converted to acetic acid. The acetic acid of the solution is then titrated with a 0.5 N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde, or the decomposition of acetaldehyde monoperacetate, originally present in the sample. The amount of acetic acid formed by reaction of peracetic acid with acetaldehyde, or from the decomposition of acetaldehyde monoperacetate, may be calculated from the previous sodium thiosulfate titration determination of epoxidizing agent content on the basis of two mols of acetic acid being formed from each mol of peracetic acid or acetaldehyde monoperacetate.

The following examples will serve to illustrate the practice of the invention:

EXAMPLE 1

*Preparation of 3,4-epoxycyclohexane-1,1-dimethanol dicrotonate*

A solution of 0.42 mol of peracetic acid in ethyl acetate was added dropwise to 107 grams of 3-cyclohexene-1,1-dimethanol dicrotonate over a period of 25 minutes, while the temperature was maintained in the range of from 45° C. to 50° C. The reaction mixture was stirred for a period of 2 hours whereupon a sample was taken and titrated for peracetic acid. The titration indicated that the reaction was 95.5 percent complete.

The reaction mixture was then cooled to 0° C. and fed dropwise into a still kettle containing ethylbenzene refluxing under 25 mm. Hg pressure absolute. During the feed, ethyl acetate, acetic acid, unreacted peracetic acid, and some ethylbenzene were removed at the still head. After the addition of the reaction mixture was completed, excess ethylbenzene was stripped off. There was obtained a residue which was then rapidly distilled batchwise without rectification to give 99 grams of a clear, viscous liquid having a boiling point in the range of 175° C. to 200° C. at 2 mm. Hg pressure absolute. The purity of the distilled product, determined by analysis by the pyridine hydrochloride method for epoxides, was 91.0 percent as 3,4-epoxycyclohexane-1,1-dimethanol dicrotonate. The oxirane oxygen content of the product was 4.97 percent.

What is claimed is:

1. Epoxyvinyl monomers characterized by the formula:

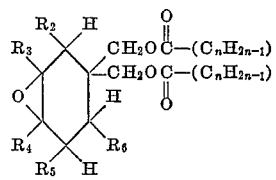

wherein $R_2$ through $R_6$ represent members selected from the group consisting of hydrogen and alkyl groups and the group $C_nH_{2n-1}$ represents an aliphatic hydrocarbon radical, free from acetylenic unsaturation, composed of carbon and hydrogen containing $n$ carbon atoms, $2n-1$ hydrogen atoms, wherein $n$ represents a whole positive integer in the range of from 2 through 8.

2. An epoxyvinyl monomer, 3,4-epoxycyclohexane-1,1-dimethanol dicrotonate.

References Cited in the file of this patent

FOREIGN PATENTS 653,351    Great Britain _____ May 16, 1951